US012610381B2

(12) United States Patent
Lu et al.

(10) Patent No.: US 12,610,381 B2
(45) Date of Patent: Apr. 21, 2026

(54) RESOURCE SELECTION METHOD AND APPARATUS, DEVICE AND STORAGE MEDIUM

(71) Applicant: GUANGDONG OPPO MOBILE TELECOMMUNICATIONS CORP., LTD., Dongguan (CN)

(72) Inventors: Qianxi Lu, Dongguan (CN); Bingxue Leng, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 311 days.

(21) Appl. No.: 18/239,392

(22) Filed: Aug. 29, 2023

(65) Prior Publication Data

US 2023/0403729 A1     Dec. 14, 2023

Related U.S. Application Data

(63) Continuation of application No. PCT/CN2021/092207, filed on May 7, 2021.

(51) Int. Cl.
H04W 72/40 (2023.01)
H04W 72/02 (2009.01)

(52) U.S. Cl.
CPC ........... H04W 72/40 (2023.01); H04W 72/02 (2013.01)

(58) Field of Classification Search
CPC .............................. H04W 72/40; H04W 72/02
See application file for complete search history.

(56) References Cited

U.S. PATENT DOCUMENTS

| 2024/0057207 A1* | 2/2024 | Basu Mallick ....... H04W 76/28 |
| 2024/0188044 A1* | 6/2024 | Miao ................. H04W 72/0446 |

FOREIGN PATENT DOCUMENTS

| CN | 112272397 A | 1/2021 |
| CN | 112640560 A | 4/2021 |

OTHER PUBLICATIONS

Fujitsu, "Alignment of sidelink DRX active time", 3GPP TSG-RAN WG2 Meeting #113bis electronic, R2-2103288, Online, Apr. 12-Apr. 20, 2021, see section 2. 5 pages.
International Search Report in the international application No. PCT/CN2021/092207, mailed on Jan. 26, 2022. 5 pages with English translation.
Written Opinion of the International Search Authority in the international application No. PCT/CN2021/092207, mailed on Jan. 26, 2022. 8 pages with English translation.
"3rd Generation Partnership Project; Technical Specification Group Radio Access Network; NR; Medium Access Control (MAC) protocol specification, (Release 16)", 3GPP TS 38.321 V16.3.0 (Dec. 2020), cited in sections 5.7, 5.22. 155 pages.

(Continued)

*Primary Examiner* — Won Tae C Kim
(74) *Attorney, Agent, or Firm* — BAYES PLLC

(57) ABSTRACT

The present application provides a resource selection method and a device, for use in sidelink communication. In a resource selection process, one or more resources used for sidelink transmission are selected according to DRX configuration information of one or more second devices, and sidelink data may be transmitted on the selected one or more resources.

16 Claims, 12 Drawing Sheets

The one or more resources for the sidelink transmission are selected according to the DRX configuration information of multiple second devices ⟋ 401

A fourth device is selected from the multiple second devices ⟋ 402

Sidelink data is sent to the fourth device on the one or more resources for the sidelink transmission ⟋ 403

(56) References Cited

OTHER PUBLICATIONS

"3rd Generation Partnership Project; Technical Specification Group Radio Access Network; NR; Radio Resource Control (RRC) protocol specification, (Release 16)", 3GPP TS 38.331 V16.3.1 (Jan. 2021), cited in sections 5.8.8. 929 pages.
"3rd Generation Partnership Project; Technical Specification Group Radio Access Network; NR; Physical layer procedures for data, (Release 16)", 3GPP TS 38.214 V16.4.0 (Dec. 2020), cited in sections 8.1.4. 168 pages.

* cited by examiner

| | |
|---|---|
| A third device is selected from multiple second devices | 301 |
| The one or more resources for the sidelink transmission are selected according to DRX configuration information of the third device | 302 |
| Sidelink data is sent to the third device on the one or more resources for the sidelink transmission | 303 |

The one or more resources for the sidelink transmission are selected according to the DRX configuration information of multiple second devices — 401

A fourth device is selected from the multiple second devices — 402

Sidelink data is sent to the fourth device on the one or more resources for the sidelink transmission — 403

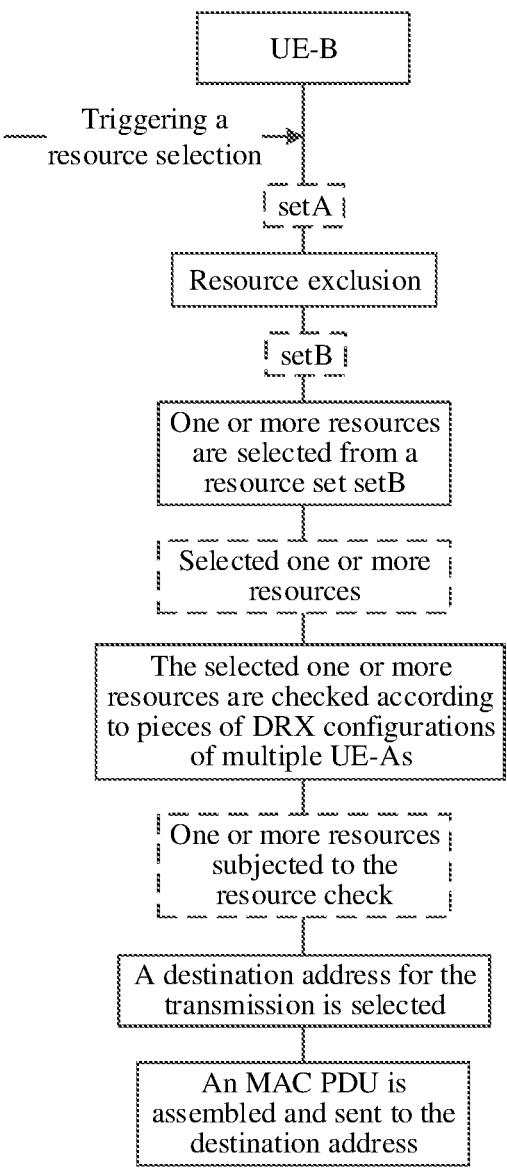

UE-B

Triggering a
resource selection setA

Resource exclusion setB

One or more resources
are selected from a
resource set setB

Selected one or more
resources

The selected one or more
resources are checked according
to pieces of DRX configurations
of multiple UE-As One or more resources
subjected to the
resource check A destination address for the
transmission is selected An MAC PDU is
assembled and sent to the
destination address

FIG. 14

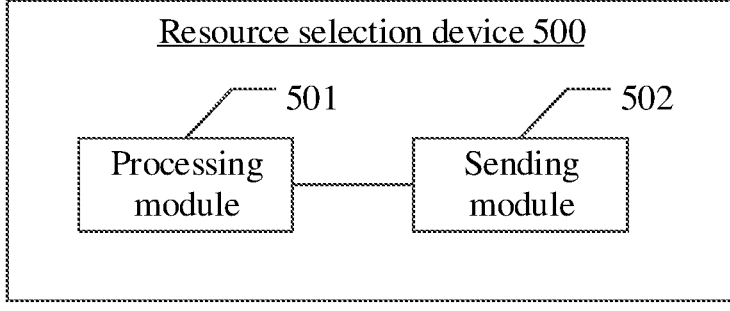

Resource selection device 500

501                    502

Processing
module

Sending
module

FIG. 15

RESOURCE SELECTION METHOD AND APPARATUS, DEVICE AND STORAGE MEDIUM

CROSS-REFERENCE TO RELATED APPLICATION

This application is a continuation of International Patent Application No. PCT/CN2021/092207 filed on May 7, 2021, which is incorporated herein by reference in its entirety.

BACKGROUND

At present, 3rd Generation Partnership Project (3GPP) defines two transmission modes in Vehicle to Everything (V2X) technology. A first transmission mode is that a terminal transmits data on a sidelink according to resources allocated by a base station, and the base station may allocate resources for single transmission or semi-static transmission to the terminal. A second transmission mode is that the terminal determines a candidate resource set according to a existing monitoring process, and then selects resources independently from the candidate resource set for the sidelink transmission.

During the monitoring process of the second transmission mode, the terminal needs to continuously monitor the resources to determine which resources are available, which cause a large consummation of energy of the terminal. In order to save energy, a Discontinuous Reception (DRX) mechanism is introduced into a Sidelink (SL) system. The terminal may perform reception of resource or data according to the DRX configuration.

Due to the introduction of the SL DRX technology, there may be a case where a terminal is in a dormant state when another terminal sends data or signaling to the terminal, which may influence the transmission performance of the whole system. Therefore, it is urgent to further optimize the current resource selection method to improve the overall performance of the sidelink communication system.

SUMMARY

Embodiments of the disclosure relates to the technical field of communication, in particular to a resource selection method and a device.

In a first aspect, embodiments of the present disclosure provide a resource selection method, applied to a first device. The method includes selecting, according to DRX configuration information of one or more second devices, one or more resources for sidelink transmission.

In a second aspect, embodiments of the present disclosure provide a resource selection device, which includes a processing module. The processing module is configured to select, according to DRX configuration information of one or more second devices, one or more resources for sidelink transmission.

In a third aspect, embodiments of the present disclosure provide an electronic device, which includes a transceiver, a processor and a memory. The memory is configured to store computer-executable instructions. The processor is configured to execute the computer-executable instructions stored in the memory, so as to enable the processor to perform the method as described in the first aspect.

In a fourth aspect, embodiments of the present disclosure provide a computer storage medium having stored thereon a computer program that, when executed by a computer, enables the computer to perform the method as described in the first aspect.

In a fifth aspect, embodiments of the present disclosure provide a computer program product that enables the computer to perform the method as described in the first aspect when the computer program product is run on the computer.

The resource selection method, and device provided by the embodiments of the disclosure may be applicable to the sidelink communication. In a resource selection process, one or more resources for the sidelink transmission can be selected in combination with the DRX configuration information of one or more second devices, and sidelink data may be sent on the selected one or more resources.

BRIEF DESCRIPTION OF THE DRAWINGS

FIG. 14 is an eleventh flowchart of a resource selection method according to an embodiment of the present disclosure.

FIG. 15 is a structural diagram of a resource selection device according to an embodiment of the present disclosure.

DETAILED DESCRIPTION

Figure 1:
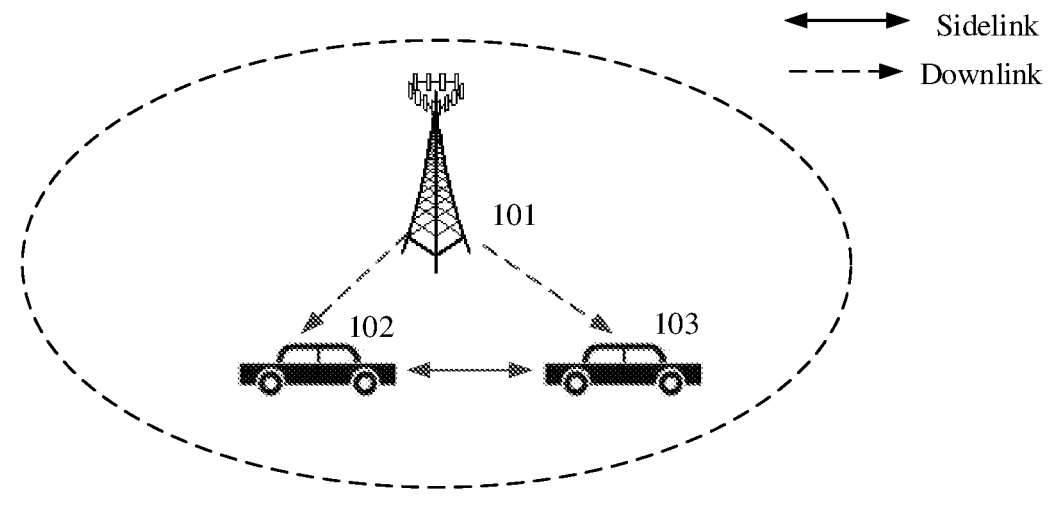
FIG. 1 is a diagram of an application scenario according to an embodiment of the present disclosure.

In order to make the object, technical solution and advantages of the embodiments of the present disclosure clearer, the technical solution of the embodiments of the present disclosure would be clearly and completely described in conjunction with the accompanying drawings in the embodiments of the present disclosure. It is apparent that the described embodiments are only part of the embodiments of the present disclosure, not all the embodiments. All other embodiments obtained by those of ordinary skill in the art based on the embodiments of the present disclosure without creative efforts all fall within the scope of protection of the present disclosure.

The terms "first", "second", etc. in the description and claims of the present disclosure and in the above drawings are used to distinguish similar objects and are not necessarily used to describe a specific sequence or sequential order. It is to be understood that data used in this way may be interchangeable where appropriate, so that the embodiments of the present disclosure described herein may be implemented in an order other than that illustrated or described herein. Furthermore, the terms "include" and "having", as well as any variations thereof, are intended to cover a non-exclusive inclusion. For example, a process, a method, a system, a product, or a device that includes a series of operations or units need not be limited to those expressly listed operations or units, but may contain other operations or units not expressly listed or inherent to such process, method, system, product, or device.

It should be understood that the expression "indicate" mentioned in the embodiments of the present disclosure may be a direct indication or an indirect indication, or may indicate that there is an association relationship. For example, A indicates B, which can indicate that A indicates B directly (e.g. B can be obtained through A), or can indicate that A indicates B indirectly (e.g. A indicates C, and B can be obtained through C), or can indicate that there is an association relationship between A and B.

In the description of the embodiments of the present disclosure, the term "correspondence" may indicate that there is a direct correspondence relationship or an indirect correspondence relationship between the two, or may indicate that there is an association relationship between the two, or may indicate that there is a relationship of indicating and being indicated, configuring and being configured, and the like.

Different from the traditional cellular system in which communication data is received or sent by a base station, the Device-to-Device (D2D) communication introduces the Sidelink (SL) transmission technology and adopts a manner of terminal-to-terminal direct communication. Therefore, the D2D communication has higher spectrum efficiency and a lower transmission delay.

The 3GPP defines two transmission modes in the Long Term Evolution (LTE) D2D/V2X, which are Mode 3 and Mode 4.

For the Mode 3, the transmission resources for the terminal are allocated by the base station, and the terminal sends data on the sidelink according to the resources allocated by the base station. The base station may allocate resources for single transmission or semi-static transmission to the terminal.

For the Mode 4, the vehicle-mounted terminal selects a resource from a resource pool to send data.

In the 3GPP, the D2D is divided into different stages for study.

1) Proximity Service (ProSe): the D2D communication in Rel-12/13 studies the scenario of the ProSe, which mainly aims at public safety services. In the ProSe, by configuring a position of a resource pool in time domain (e.g., the resource pool is discontinuous in the time domain), a User Equipment (UE) may discontinuously send or receive data on the sidelink, thereby achieving the effect of power saving.

2) Vehicle to Everything (V2X), a scenario of the vehicle-to-vehicle communication in the V2X system is studied in Rel-14/15, which mainly focuses on services of communication between vehicles or between the vehicle and the person with a high relative speed. In the V2X, due to the continuous power supply for the vehicle-mounted system, the data transmission delay, rather than the power efficiency, is the main problem. Therefore, it is required in the system design that the terminal may perform continuous transmission and reception.

3) Wearable device (FeD2D): a scenario in which the wearable device accesses the network through a mobile phone is studied in Rel-14, which mainly focuses on the scenarios of accessing with a low moving speed and a low power access. In the FeD2D, in the pre-study stage, the 3GPP concluded that the base station may configure the DRX parameters of a remote UE through a relay UE. However, since this study has not further entered the standardization stage, there is no conclusion on the specific details of how to configure the DRX.

Before introducing the technical solution provided by the embodiments of the present disclosure, the possible application scenarios of the embodiments of the present disclosure are first explained.

FIG. 1 is a diagram of an application scenario according to an embodiment of the present disclosure. The communication system shown in FIG. 1 includes one network device 101 and two terminals (i.e., terminal 102 and terminal 103). Both the terminal 102 and the terminal 103 are located within the coverage area of the network device 101. The network device 101 is in communication connection with the terminal 102 and the terminal 103, respectively. The terminal 102 is in communication connection with the terminal 103. Exemplarily, the terminal 102 may send a communication message to the terminal 103 through the network device 101, and the terminal 102 may also send a communication message to the terminal 103 directly. A link for the direct communication between the terminal 102 and the terminal 103 is referred to as a D2D link and may also be referred to as a ProSe link, a sidelink and the like. Transmission resources on the D2D link may be allocated by the network device.

Figure 2:
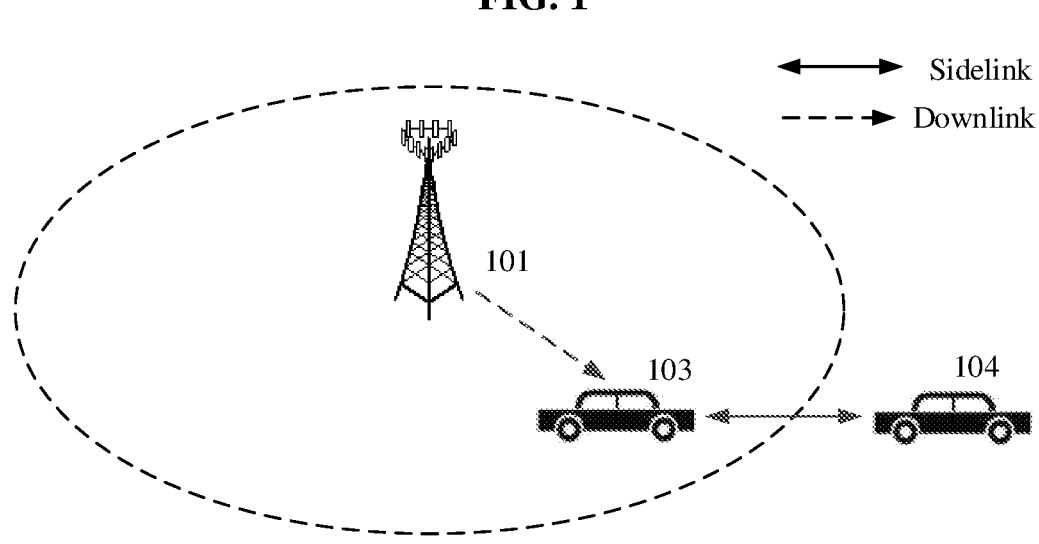
FIG. 2 is a diagram of another application scenario according to an embodiment of the present disclosure.

Exemplarily, FIG. 2 is a diagram of another application scenario according to an embodiment of the present disclosure. The communication system shown in FIG. 2 also includes one network device 101 and two terminals. FIG. 2 is different from FIG. 1 in that the terminal 103 is located within the coverage area of the network device 101 and the terminal 104 is located outside the coverage area of the network device 101. The network device 101 is in communication connection with the terminal 103, and the terminal 103 is in communication connection with the terminal 104. Exemplarily, the terminal 103 may receive the configuration information sent by the network device 101 and perform the sidelink communication according to the configuration information. Since the terminal 104 cannot receive the configuration information sent by the network device 101, the terminal 104 may perform the sidelink communication based on pre-configuration information and information carried in a Physical Sidelink Broadcast Channel (PSBCH) sent by the terminal 103.

Figure 3:
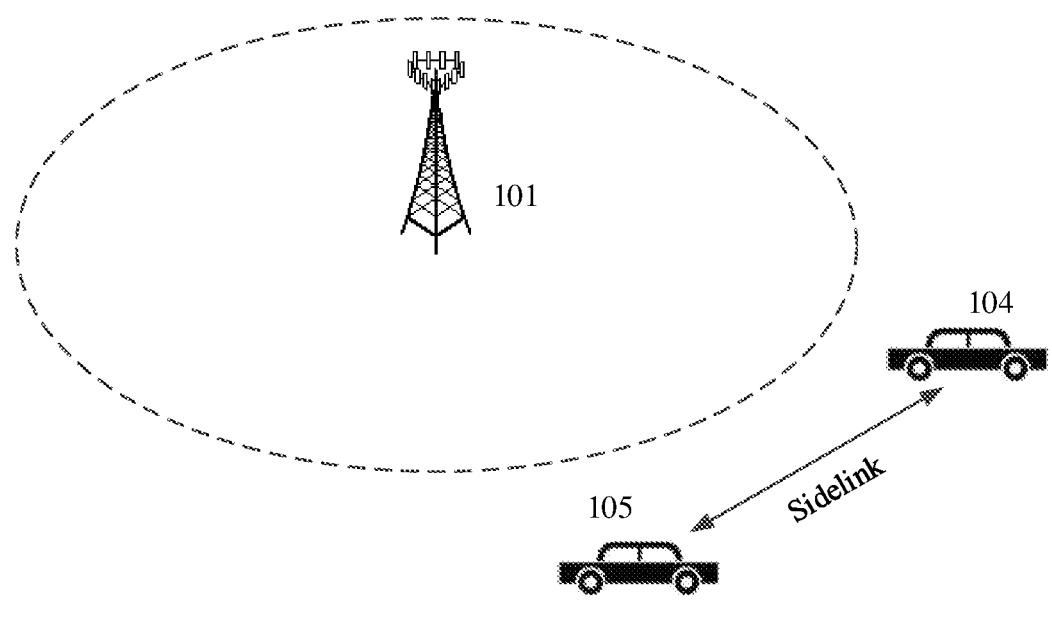
FIG. 3 is a diagram of yet another application scenario according to an embodiment of the present disclosure.

Exemplarily, FIG. 3 is a diagram of yet another application scenario according to an embodiment of the present disclosure. Both the terminal 104 and the terminal 105 shown in FIG. 3 are located outside the coverage area of the network device 101. Both the terminal 104 and the terminal

105 may determine the sidelink configuration according to the pre-configuration information to perform the sidelink communication.

The terminal in the embodiments of the disclosure may also be referred to as a terminal device, which may be a device with a wireless transceiver function. The terminal may be deployed on land, including indoor or outdoor, handheld or vehicle-mounted; or may be deployed on a water surface (such as a ship); or may be deployed in the air (such as an aircraft, a balloon, a satellite, or the like). The terminal may be a UE. The UE may include a handheld device, a vehicle-mounted device, a wearable device or a computing device having a wireless communication function. Exemplarily, the UE may be a mobile phone, a tablet computer, or a computer with a wireless transceiver function. The terminal may also be a Virtual Reality (VR) terminal, an Augmented Reality (AR) terminal, a wireless terminal in industrial control, a wireless terminal in unmanned driving, a wireless terminal in telemedicine, a wireless terminal in a smart grid, a wireless terminal in a smart city, a wireless terminal in a smart home, etc. In the embodiments of the present disclosure, the device configured to realize the functions of a terminal may be a terminal, and may also be a device capable of supporting the terminal to realize the functions, such as a chip system, which may be installed in the terminal. In the embodiments of the present disclosure, the chip system may be composed of chips or may include chips and other discrete devices.

In the embodiments of the present disclosure, the network device includes a Base Station (BS), and the network device may be a device deployed in a radio access network and capable of performing the wireless communication with the terminal. The base station may be embodied in various forms, such as a macro site, a micro site, a relay station and an access point. Exemplarily, the base station in the embodiments of the present disclosure may be a base station in the 5th generation mobile networks (5G) or a base station in the LTE. The base station in the 5G may also be referred to as a Transmission Reception Point (TRP) or a gNB. In the embodiments of the present disclosure, the device configured to realize the functions of the network device may be a network device, and may also be a device capable of supporting the network device to realize the functions, such as the chip system, which may be installed in the network device.

The technical solution of the embodiments of the disclosure is mainly applied to the communication system based on a New Radio (NR) technology, such as the 5G communication system, an NR-V2X communication system, an NR-V2V communication system and the like. The technical solution may also be applied to other communication systems as long as there is a resource scheduling between entities in the communication system. For example, the technical solution may be applied to the resource scheduling between two terminals, and one of the two terminals undertakes the functions of accessing the network.

It should be noted that the system architecture and application scenarios described in the embodiments of the disclosure are intended to more clearly explain the technical solution of the embodiments of the disclosure, and do not constitute a limitation to the technical solution provided by the embodiments of the disclosure. Those skilled in the art would be aware of that the technical solution provided by the embodiments of the disclosure is equally applicable to similar problems with the evolution of the network architecture and the emergence of new service scenarios.

In the NR-V2X communication, X may generally be any device with wireless receiving and sending capabilities. X may include, but is not limited to, a slow-moving wireless device, a fast-moving vehicle-mounted device, a network control node with wireless transmitting and receiving capabilities, etc. The NR-V2X communication supports unicast transmission mode, multicast transmission mode and broadcast transmission mode. For the unicast transmission, the sending terminal sends data, and there is only one receiving terminal. For the multicast transmission, the sending terminal sends data, and the receiving terminals are all terminals in a communication group or all terminals within a certain transmission distance. For the broadcast transmission, the sending terminal sends data, and the receiving terminal is any terminal around the sending terminal.

Similar to the LTE-V2X, the NR-V2X also defines two transmission modes: mod-1 or mod-2.

For the first transmission mode (i.e., mode-1): the transmission resources of the terminal are allocated by the base station, and the terminal sends data on the sidelink according to the resources allocated by the base station. The base station may allocate the resources for single transmission to the terminal, and may also allocate the resources for semi-static transmission to the terminal.

Exemplarily, in FIG. 1, the terminal 102 is located within the coverage area of the network device 101, and the network device 101 allocates the transmission resources for the sidelink transmission to the terminal 102.

For the second transmission mode (i.e., mod-2): if the terminal has the monitoring capability, the terminal may send data in a manner of monitoring and reservation or in a manner of randomly selecting resources. In the manner of monitoring and reservation, the terminal can obtain the available resource set by monitoring from a resource pool configured by the network or a pre-configuration resource pool, and randomly select the resources from the available resource set for transmitting data. If the terminal does not have the monitoring capability, the terminal may randomly select the transmission resources directly from the resource pool.

The monitoring mentioned above means that the terminal receives first sidelink control information sent by other terminals, and acquires the resources reserved for other terminals according to indication of the first sidelink control information. Resource collision with other terminals can be avoided by excluding the resources reserved for other terminals during the resource selection.

Exemplarily, the terminal 102 in FIG. 1 may independently select, from the resource pool configured by the network, the transmission resources to perform the sidelink transmission. In FIG. 3, both the terminal 104 and terminal 105 are located outside the coverage area of the network device 101, and the terminal 104 and terminal 105 may independently select, from the pre-configured resource pool, the transmission resources to perform the sidelink transmission.

In some embodiments, the terminal may be in a hybrid mode. That is, the terminal may acquire the resources by using both the mode-1 and the mode-2.

Different from the LTE V2X, except for a Hybrid Automatic Repeat reQuest (HARQ) initiated by UE without a feedback, the NR V2X introduces HARQ retransmission based on the feedback. That is, the device at the sending end may determine whether the data retransmission is needed based on the feedback information from the device at the receiving end. The HARQ retransmission based on the feedback is not limited to the unicast communication, but also the multicast communication.

Similar to the LTE-V2X, in the NR-V2X, due to the continuous power supply for the vehicle-mounted system, the data transmission delay, rather than the power efficiency, is the main problem. Therefore, it is required in the system design that the terminal may perform continuous transmission and reception.

In the NR-V2X, some new characteristics are introduced, such as, supporting a large number of aperiodic services, increasing a number of times of the retransmission and a more flexible resource reservation period etc. All these characteristics have great influence on the mode of terminal independently selecting resources. Therefore, based on the Mode 4 in the LTE-V2X, the 3GPP re-discusses and designs a resource selection scheme suitable for the NR-V2X mod-2, which includes the following operations. A UE selects, from the resource pool, resources that are not reserved for other UEs or that are reserved for other UEs but have a lower reception power by means of decoding Sidelink Control Information (SCI) sent by other UEs and by means of measuring the reception power of the sidelink. The resource selection for the NR-V2X mod-2 mainly includes the following two operations.

In a first operation, the UE determines a candidate resource set.

The UE takes all available resources in the resource selection window as a resource set A. Firstly, the UE needs to determine whether a resource is reserved for other UEs according to a monitoring result in the resource monitoring window. The UE performs resources exclusion according to an unmonitored slot and the monitored first-order SCI. After the resources exclusion, if a ratio of a number of remaining resources in the resource set A to a number of the resources in the resource set A is less than a certain proportion, the UE would increase a threshold of Reference Signal Received Power (RSRP) by 3 dB, and repeat the operation 1 until the ratio of the number of remaining resources in the resource set A to the number of the resources in the resource set A is greater than or equal to the proportion. Compared with the LTE-V2X in which the proportion is fixed to 20%, the value of the proportion in the NR-V2X is more flexible, which may has a value of {20%, 35%, 50%}. The specific value of the proportion is configured by the network or pre-configured with the resource pool as a unit. Finally, the resource set A subjected to the resource exclusion is the candidate resource set of UE.

In a second operation, the UE selects transmission resources from the candidate resource set.

The UE randomly selects one or more transmission resources with an equal probability from the candidate resource set. It should be pointed out that the two following restrictions in the time domain should be satisfied when the multiple transmission resources are selected.

Firstly, after excluding some exceptions, the UE should make a selected retransmission resource to be indicated by the first-order SCI sent previously. The above exceptions may include the case in which the UE cannot select, from candidate resource set, a resource satisfying the restrictions in the time domain after the resource exclusion. The above exceptions may further include the following case. The UE abandons the transmission due to factors such as resource preemption, congestion control and conflicts with uplink services, results in the transmission resources of a certain retransmission not being indicated by the first-order SCI sent previously.

Secondly, for any two selected time-frequency resources, if a former transmission resource of the two selected time-frequency resources needs the HARQ feedback, the UE should ensure that a time interval between the two transmission resources in the time domain is greater than or equal to Z. When the resource selection cannot satisfy the restrictions in the time domain, for example, in a case where a Packet Delay Budget (PDB) is short but the number of the times of the retransmission is large, some retransmission resources may be abandoned or the HARQ may be deactivated for certain transmissions based on the implementation performed by the UE.

In the wireless network, when there is data to be transmitted, the UE should always monitor the Physical Downlink Control Channel (PDCCH), and send and receive the data according to the indication message from the network side, which result in a large power consumption and a large data transmission delay of the UE. Therefore, the 3GPP standard protocol introduces the DRX power saving strategy.

A basic mechanism of the DRX is to configure a UE in a RRC_CONNECTED state with a DRX cycle. The DRX cycle consists of "On Duration" and "Opportunity for DRX". During the "On Duration" (also referred to as active time), the UE monitors and receives the PDCCH. During the "Opportunity for DRX" (also referred to as inactive time or sleep time), the UE does not receive the PDCCH so as to reduce the power consumption. Compared with the DRX On Duration, the Opportunity for DRX can also be referred to as DRX off duration.

In the DRX operation, the terminal controls itself to be in the active time or the inactive time according to some timer parameters configured by the network. For example, when the UE receives the PDCCH for the network to schedule the UE during the On Duration, the UE activates a timer, such as a drx_inactiveTimer. The terminal is in the active state before the timer expires.

The UE discontinuously monitors the PDCCH according to the DRX configuration to save power. When the PDCCH carries Cell-Radio Network Temporary Identifier (C-RNTI), CI-RNTI, CS-RNTI, INT-RNTI, SFI-RNTI, SP-CSI-RNTI, TPC-PUCCH-RNTI, TPC-PUSCH-RNTI, TPC-SRS-RNTI and AI-RNTI that correspond to the UE, the UE would perform corresponding DRX operations according to the control information.

The network controls the DRX behavior of the UE by configuring a series of parameters (i.e., Uu DRX parameters), which including drx-onDurationTimer, drx-SlotOffset, drx-InactivityTimer, drx-Retransmis sionTimerDL, drx-RetransmissionTimerUL, drx-LongCycleStartOffset, drx-ShortCycle (optional): the Short DRX cycle, drx-ShortCycleTimer (optional), HARQ-RTT-TimerDL, drx-HARQ-RTT-TimerUL, ps-Wakeup (optional), ps-TransmitOtherPeriodicCSI (optional), ps-TransmitPeriodicL1-RSRP (optional).

The UE would be in the DRX active state when at least one of the following cases is satisfied.

The drx-onDurationTimer or drx-InactivityTimer is running.

The drx-RetransmissionTimerDL or drx-RetransmissionTimerUL is running.

The ra-ContentionResolutionTimer or msgB-ResponseWindow is running.

There is an unprocessed Scheduling Request (SR).

The PDCCH indicates that there is a new transmission duration.

During the monitoring of the NR-V2X mod-2, the terminal needs to continuously monitor the resources to determine which resources are available, which result in the terminal consuming too much energy. In order to save power, it is considered to introduce the DRX mechanism into the SL system. Similar to the DRX mechanism of a Uu interface, the terminal receives data sent by other terminals within the On Duration. If no data is detected, the terminal enters a sleep state within the DRX off duration to save power consumption. If data sent by other terminals to the terminal is detected, the terminal would activate the timer, and the terminal would be in the active state before the timer expires. In the present disclosure, the DRX active state indicates that the UE is in the active state and may receive sidelink data (i.e., the SCI) from other UEs. The DRX inactive state indicates that the UE is in an inactive state and skips (i.e., does not receive) sidelink data (i.e., the SCI) from other UEs.

Due to the introduction of the SL DRX technology, the UE at the sending end needs to take into account the DRX configuration of the UE at the receiving end when selecting resources. Therefore, it is urgent to further optimize the current resource selection method to improve the overall performance of the sidelink communication system.

In order to solve the above technical problems, the embodiments of the disclosure provide a resource selection method. According to the method, an operation of selecting resources according to the DRX configuration information of the UE at the receiving end is added during the resource selection process, which may be added before the first operation (i.e., the resource exclusion), or after the first operation of the resource selection, or after the second operation (i.e., resource reservation) of the resource selection. If there are multiple UEs at the receiving end that need to send data, the DRX configuration information of the multiple UEs at the receiving end may be comprehensively considered during the resource selection process, so as to improve the transmission performance of the sidelink communication system.

The technical solution provided by the embodiments of the present disclosure would be described in detail below through specific embodiments. It should be noted that the technical solution provided by the embodiments of the present disclosure may include some or all of the following contents. The following specific embodiments may be combined with each other, and the same or similar concepts or processes may not be repeated in some embodiments.

It should be noted that the methods provided in the following embodiments may be applied to any device in the sidelink communication. In order to facilitate understanding, the following description is made with first device as an executor of the method.

Figure 4:
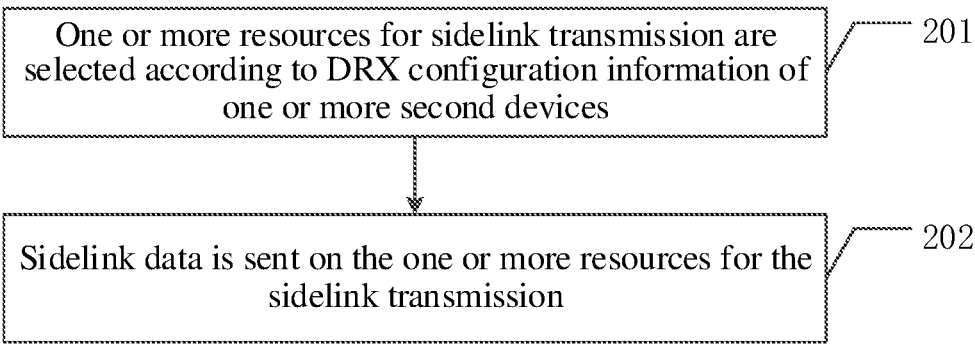
FIG. 4 is a first flowchart of a resource selection method according to an embodiment of the present disclosure.

FIG. 4 is a first flowchart of a resource selection method according to an embodiment of the present disclosure. As shown in FIG. 4, the resource selection method of the present embodiment includes the following operations.

At operation 201, one or more resources for sidelink transmission are selected according to DRX configuration information of one or more second devices.

At operation 202, sidelink data is sent on the one or more resources for the sidelink transmission.

In the embodiment, the first device is a device at the sending end, and the second device is a device at the receiving end. The second device communicates with the first device through a sidelink. The DRX configuration information of the second device may be configured by the network, and/or configured by the first device, and/or configured by the second device itself, and/or pre-configured. The DRX configuration information of the second device may indicate the DRX active time of the second device, and the specific DRX configuration information may refer to the Uu DRX parameters mentioned above.

In an optional embodiment of the present disclosure, if there is only one second device, one or more resources for the sidelink transmission may be selected according to the DRX configuration information of the second device. Sidelink data may be sent to the second device on the one or more resources for the sidelink transmission.

In an optional embodiment of the present disclosure, if there are multiple second devices, one or more resources for the sidelink transmission may be selected according to the DRX configuration information of the multiple second devices. The sidelink data is sent to at least one of the multiple second devices on the one or more resources for the sidelink transmission.

According to the resource selection method provided by the embodiment, the one or more resources for the sidelink transmission are selected in combination with the DRX configuration information of the one or more second devices during the resource selection process, and the sidelink data may be sent on the selected one or more resources. Since the DRX configuration of the receiving device is taken into account in the selection of the transmission resources, it can be ensured that the receiving device is in the DRX active time when the sidelink data is sent, which improves the reliability of the data transmission for the sidelink communication.

A first optional embodiment of the embodiments of FIG. 4 is described in detail below with reference to FIG. 5 to FIG. 9.

Figure 5:
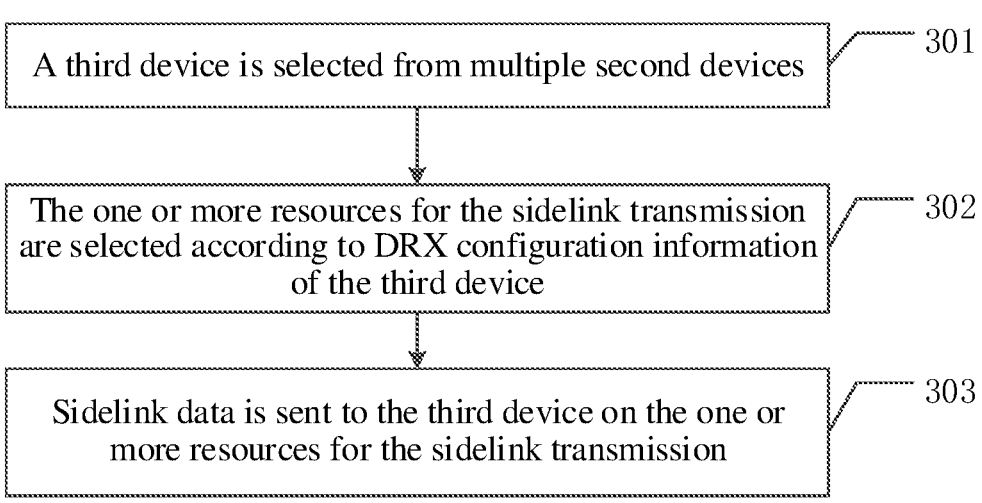
FIG. 5 is a second flowchart of a resource selection method according to an embodiment of the present disclosure.

Exemplarily, FIG. 5 is a second flowchart of a resource selection method according to an embodiment of the present disclosure. As shown in FIG. 5, the resource selection method of the present embodiments includes the following operations.

At operation 301, a third device is selected from multiple second devices.

At operation 302, the one or more resources for the sidelink transmission are selected according to DRX configuration information of the third device.

At operation 303, the sidelink data is sent to the third device on the one or more resources for the sidelink transmission.

In an optional embodiment of the present disclosure, the third device satisfies at least one of following two conditions.

The third device is a device triggering a resource selection from the multiple second devices.

The third device is a device having at least one of a Medium Access Control Control Element (MAC CE) or a logical channel with a highest priority from the multiple second devices.

In this embodiment, the operation that the third device is selected from the multiple second devices may also be described as an operation that a destination address for the transmission is selected from multiple destination addresses, which may include at least one of the following strategies.

A destination address corresponding to a logical channel (LCH) or an MAC CE that triggers the resource selection is selected as the destination address for the transmission.

A destination address corresponding to a LCH with a highest priority or an MAC CE is selected as the destination address for the transmission.

It should be pointed out that the destination address mentioned above is destination L2 ID.

In an optional embodiment of the present disclosure, the one or more resources for the sidelink transmission are selected according to the DRX configuration information of the third device from an available resource set of a resource selection window.

Figure 6:
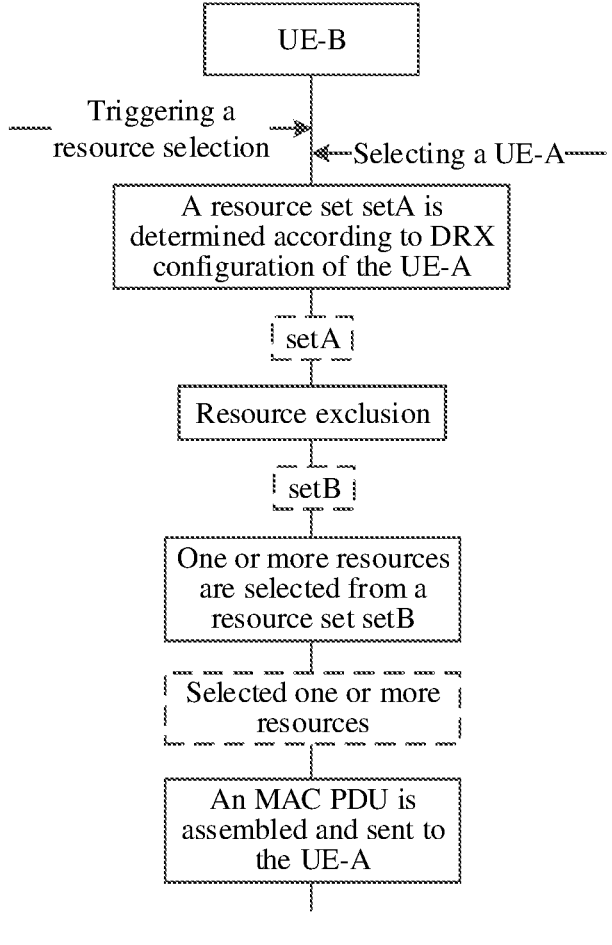
FIG. 6 is a third flowchart of a resource selection method according to an embodiment of the present disclosure.

Exemplarily, FIG. 6 is a third flowchart of a resource selection method according to an embodiment of the present disclosure. As shown in FIG. 6, the method includes the following operations.

At operation 1, a UE-B selects the destination address for the transmission of a UE-A according to the above mentioned selection strategies.

At operation 2, the UE-B filters resources according to DRX configuration information of the UE-A to obtain a resource set setA.

At operation 3, the UE-B performs resource exclusion based on the resource set setA to obtain a resource set setB.

In the embodiment, the UE-B needs to determine whether a resource in the resource set setA is reserved for other UEs according to an monitoring result in the resource monitoring window, and perform resources exclusion according to an unmonitored slot and the monitored first-order SCI to obtain the resource set setB. If a ratio of a number of remaining resources in the resource set setB to a number of the resources in the resource set setB is less than a certain proportion (e.g., 20%, 35%, 50%), the RSRP threshold is adjusted and the operation 3 is repeated until the ratio of the number of remaining resources in the resource set setB to the number of the resources in the resource set setB is greater than or equal to the proportion.

At operation 4, the UE-B selects the one or more resources from the resource set setB.

At operation 5, the UE-B selects an LCH corresponding to the destination address UE-A, assembles a Medium Access Control layer Protocol Data Unit (MAC PDU), and sends the MAC PDU to the UE-A.

In the above embodiment, only one target UE is selected as the target address, and the DRX configuration information of the target UE is considered before the first operation (i.e., the resource exclusion) of the resource selection. The available resource set is determined according to the DRX configuration information of the target UE, and the one or more resources are selected from the available resource set to perform the sidelink data transmission, thereby improving the reliability of the sidelink transmission.

In an optional embodiment of the present disclosure, a position of a resource selection window may be adjusted according to the DRX configuration information of the third device, and the one or more resources for the sidelink transmission may be selected from an available resource set of the adjusted resource selection window.

Figure 7:
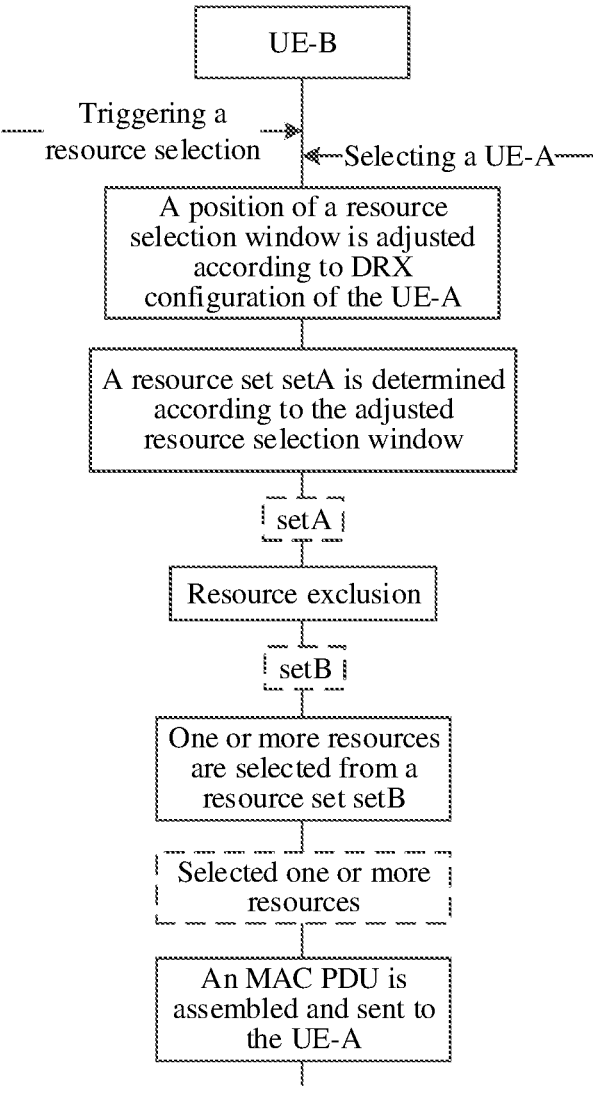
FIG. 7 is a fourth flowchart of a resource selection method according to an embodiment of the present disclosure.

FIG. 7 is a fourth flowchart of a resource selection method according to an embodiment of the present disclosure. As shown in FIG. 7, the method includes the following operations.

At operation 1, a UE-B selects a destination address for the transmission of a UE-A according to the above mentioned selection strategy.

At operation 2, the UE-B adjusts a position of a resource selection window according to DRX configuration information of the UE-A.

At operation 3, the UE-B determines a resource set setA according to the adjusted resource selection window and/or the DRX configuration information of the UE-A.

At operation 4, the UE-B performs resource exclusion based on the resource set setA to obtain a resource set setB.

This operation is the same as the operation 3 of the embodiment shown in FIG. 6, and reference can be made to the above embodiment for details.

At operation 5, the UE-B selects the one or more resources from the resource set setB.

At operation 6, the UE-B selects an LCH corresponding to the destination address of the UE-A, assembles an MAC PDU, and sends the MAC PDU to the UE-A.

In the above embodiment, only one target UE is selected as the target address, and the DRX configuration information of the target UE is considered before the first operation (i.e., the resource exclusion) of the resource selection. The position of the resource selection window is adjusted according to the DRX configuration information of the target UE, and one or more resources are selected from the available resource set of the adjusted resource selection window according to the DRX configuration information of the target UE to perform the sidelink data transmission, thereby improving the reliability of sidelink transmission.

In an optional embodiment of the present disclosure, the one or more resources for the sidelink transmission are selected according to the DRX configuration information of the third device from an available resource set obtained by the resource exclusion.

Figure 8:
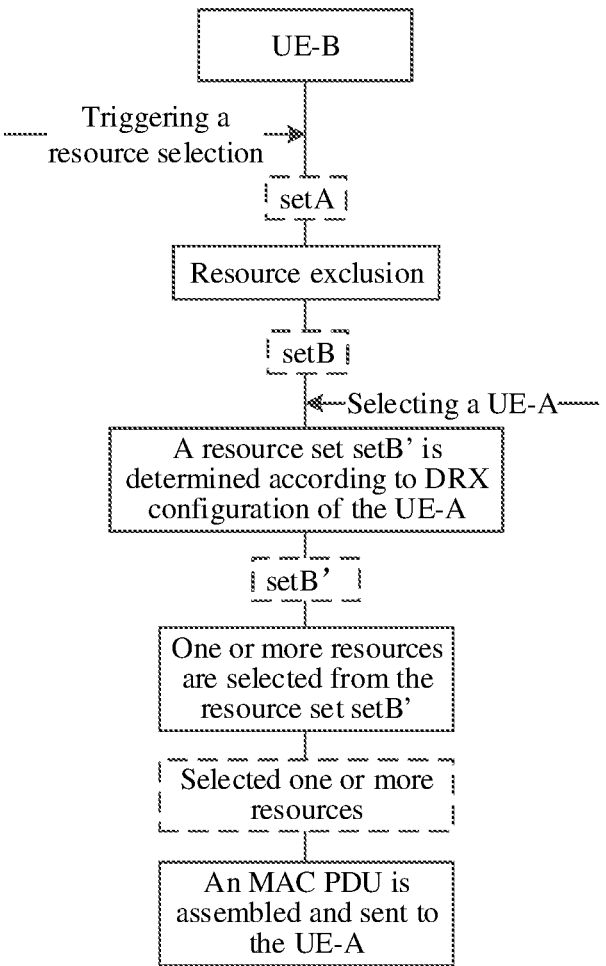
FIG. 8 is a fifth flowchart of a resource selection method according to an embodiment of the present disclosure.

Exemplarily, FIG. 8 is a fifth flowchart of a resource selection method according to an embodiment of the present disclosure. As shown in FIG. 8, the method includes the following operations.

At operation 1, a UE-B performs resource exclusion based on a resource set setA to obtain a resource set setB.

This operation is the same as the operation 3 of the embodiment shown in FIG. 6, and reference can be made to the above embodiment for details.

At operation 2, the UE-B selects a destination address for the transmission of a UE-A according to the above mentioned selection strategy.

At operation 3, the UE-B determines a resource set setB' according to DRX configuration information of the UE-A.

At operation 4, the UE-B selects one or more resources from the resource set setB'.

At operation 5, the UE-B selects an LCH corresponding to the destination address of the UE-A, assembles an MAC PDU, and sends the MAC PDU to the UE-A.

In the above embodiments, only one target UE is selected as the destination address, and the DRX configuration information of the target UE is considered after the first operation (i.e., the resource exclusion) of the resource selection. According to the DRX configuration information of the target UE, the one or more resources are selected from the available resource set obtained by the resource exclusion to perform the sidelink data transmission, thereby improving the reliability of sidelink transmission.

In an optional embodiment of the present disclosure, an available resource set is selected from available resources obtained by the resource selection, and the one or more resources for the sidelink transmission are selected according to the DRX configuration information of the third device from the available resource set.

Figure 9:
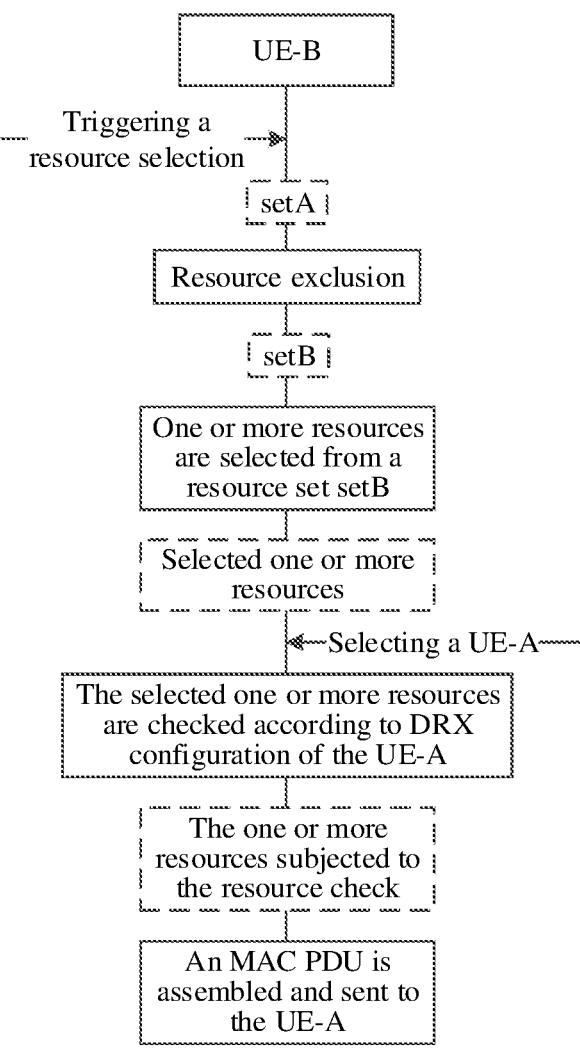
FIG. 9 is sixth flowchart of a resource selection method according to an embodiment of the present disclosure.

Exemplarily, FIG. 9 is a sixth flowchart of a resource selection method according to an embodiment of the present disclosure. As shown in FIG. 9, the method includes the following operations.

At operation 1, a UE-B performs resource exclusion based on a resource set setA to obtain a resource set setB.

This operation is the same as the operation 3 of the embodiment shown in FIG. 6, and reference can be made to the above embodiment for details.

At operation 2, the UE-B selects an available resource set from the resource set setB.

The available resource set includes one or more available resources.

At operation 3, the UE-B selects a destination address for the transmission of a UE-A according to the above mentioned selection strategy.

At operation 4, the UE-B checks resources in the selected available resource set according to DRX configuration information of the UE-A to obtain one or more resources obtained by the resource check.

The one or more resources obtained by the resource check are one or more resources matching with the DRX configuration of the UE-A. The one or more resources matching with the DRX configuration of the UE-A means that positions in the time domain of the one or more resources obtained by the resource check is located within a duration where the UE-A is in the DRX active state.

At operation 5, the UE-B selects an LCH corresponding to the destination address of the UE-A, assembles an MAC PDU, and sends the MAC PDU to the UE-A.

In the above embodiment, only one target UE is selected as the destination address, and the DRX configuration information of the target UE is considered after the second operation (i.e., resource reservation) of the resource selection. The one or more resources matching with the DRX configuration of the target UE are selected to perform the sidelink data transmission, thereby improving the reliability of the sidelink transmission.

According to the resource selection method provided by the above embodiments, resources are selected by considering the DRX configuration information of only one target UE before the first operation (i.e., the resource exclusion) of the resource selection, or after the first operation of the resource selection, or after the second operation (i.e., resource reservation) of the resource selection, so as to ensure that the target UE is in the DRX active time when sidelink data is sent, thereby improving the reliability of data transmission in the sidelink communication.

A second optional embodiment of the embodiments of FIG. 4 is described in detail below with reference to FIG. 10 to FIG. 14.

Figure 10:
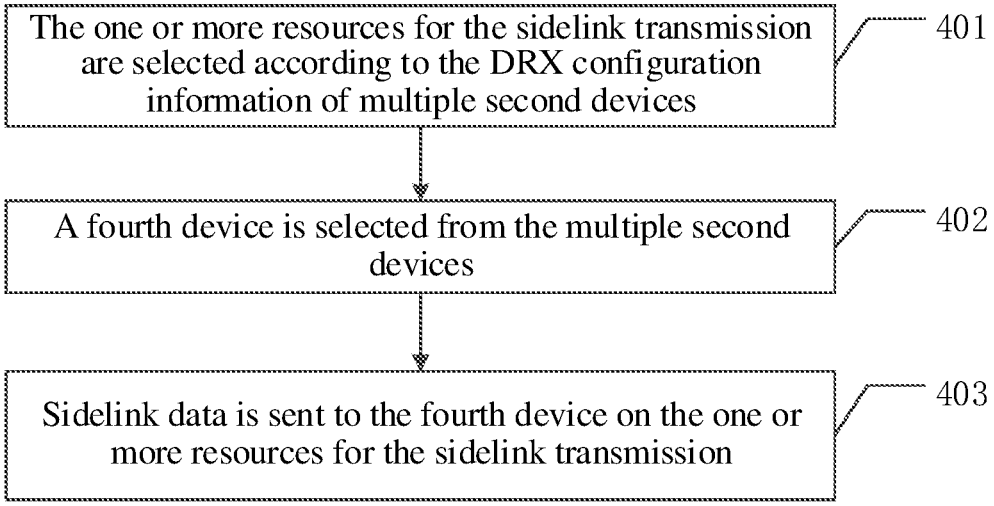
FIG. 10 is a seventh flowchart of a resource selection method according to an embodiment of the present disclosure.

FIG. 10 is a seventh flowchart of a resource selection method according to an embodiment of the present disclosure. As shown in FIG. 10, the resource selection method of the present embodiment includes operations.

At operation 401, one or more resources for the sidelink transmission are selected according to DRX configuration information of multiple second devices.

At operation 402, a fourth device is selected from multiple second devices.

In an optional embodiment of the present disclosure, the fourth device satisfies at least one of following conditions.

The fourth device is a device having at least one of an MAC CE or a logical channel with a highest priority from the multiple second devices.

The fourth device is a device in a DRX activation state on the one or more resources for the sidelink transmission from the multiple second devices.

In this embodiment, the operation that the fourth device is selected from the multiple second devices may also be described as an operation that a destination address for the transmission is selected from multiple destination addresses. The destination address for the transmission satisfies at least one of following conditions.

The destination address for the transmission has an MAC CE or a LCH with a highest priority.

The destination address for the transmission is in DRX active state for receiving data at a selected resource.

At operation 403, sidelink data is sent to the fourth device on the one or more resources for the sidelink transmission. In an optional embodiment of the present disclosure, one or more resources for the sidelink transmission may be selected according to the DRX configuration information of the multiple second devices from an available resource set in a resource selection window.

Figure 11:
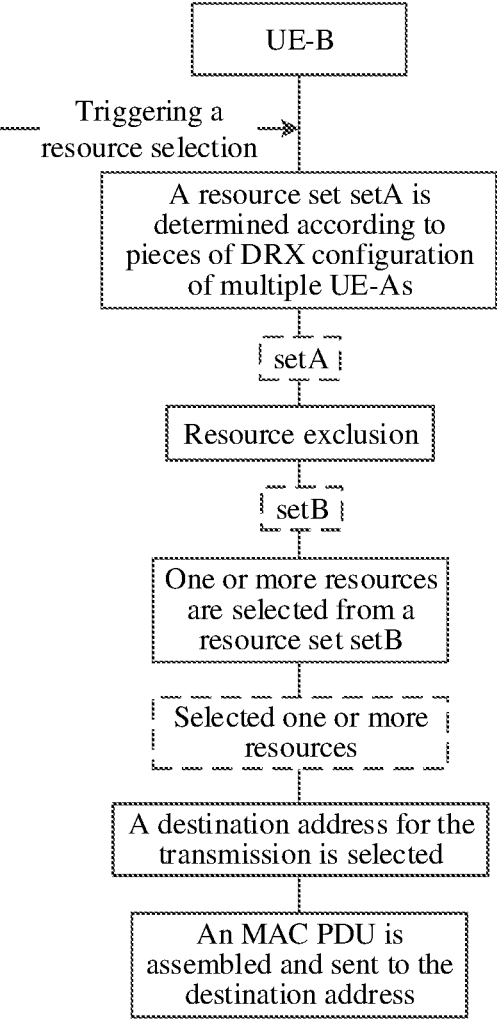
FIG. 11 is an eighth flowchart of a resource selection method according to an embodiment of the present disclosure.

FIG. 11 is an eighth flowchart of a resource selection method according to an embodiment of the present disclosure. As shown in FIG. 11, the method includes the following operations.

At operation 1, a UE-B determines a resource set setA according to DRX configuration information of multiple UE-As.

In an optional embodiment of the present embodiment, the UE-B may determine the resource set setA according to an intersection of the DRX configuration information of the multiple UE-As. That is, it is ensured that resources in the resource set setA can be used for the transmission of the multiple UEs at the receiving end.

In an optional embodiment of the present embodiment, the UE-B may determine the resource set setA according to a union of the DRX configurations of the multiple UE-As. That is to say, it is ensured that the resources in the resource set setA can be used for the transmission of at least one of the multiple UEs at the receiving end.

In an optional embodiment of the present embodiment, if the DRX configurations of the multiple UE-As do not match with each other (i.e., the intersection of the DRX configurations does not exist), the UE-B determines the resource set setA according to other comprehensive considerations. Exemplarily, a*N UE-As are randomly selected from N UE-As according to a preset proportion a (for example, a has a value of 50%), and the resource set setA is determined according to DRX configuration information of the a*N UE-As.

At operation 2, the UE-B performs resource exclusion based on the resource set setA to obtain a resource set setB.

This operation is the same as the operation 3 of the embodiment shown in FIG. 6, and reference can be made to the above embodiment for details.

At operation 3, the UE-B selects one or more resources from the resource set setB.

At operation 4, the UE-B selects a destination address for the transmission.

The selection strategy of the destination address for this operation is the same as that of the operation 402 of the embodiment shown in FIG. 10, and reference can be made to the above embodiment for details.

At operation 5, an MAC PDU is assembled and sent to the destination address.

The DRX configuration information of the multiple target UEs are considered in the above embodiments, and the DRX configuration information of the multiple target UEs are considered before the first operation (i.e., the resource exclusion) of the resource selection. The available resource set is determined according to the DRX configuration information of the multiple target UEs, and the one or more resources are selected from the available resource set to perform the sidelink data transmission, thereby improving the reliability of sidelink transmission.

In an optional embodiment of the present disclosure, a position of the resource selection window is adjusted according to the DRX configuration information of the multiple second devices; and the one or more resources for the sidelink transmission are selected from an available resource set of the adjusted resource selection window.

Figure 12:
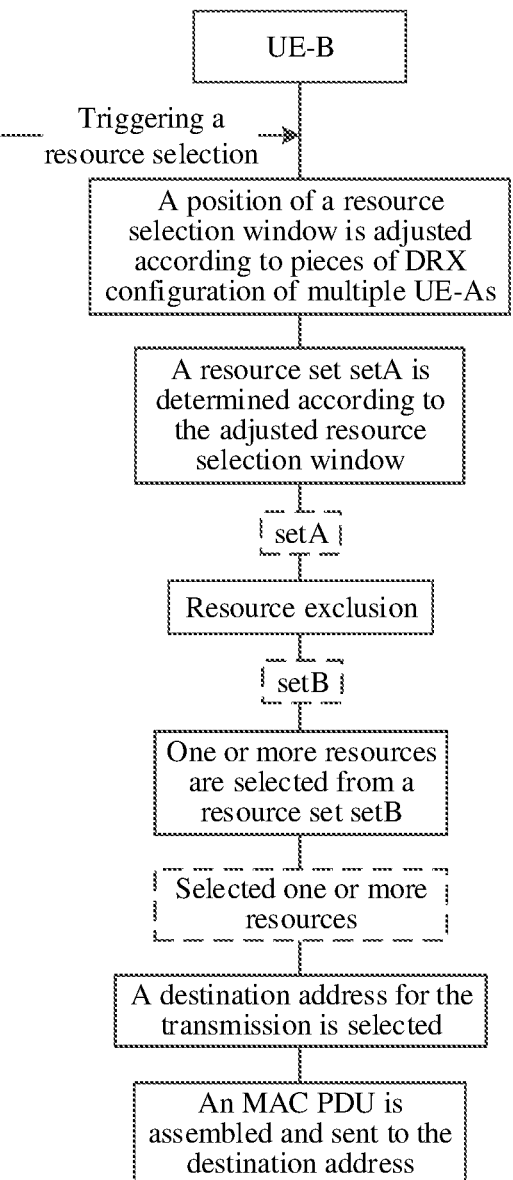
FIG. 12 is a ninth flowchart of a resource selection method according to an embodiment of the present disclosure.

FIG. 12 is a ninth flowchart of a resource selection method according to an embodiment of the present disclosure. As shown in FIG. 12, the method includes the following operations.

At operation 1, a UE-B adjusts a position of a resource selection window according to DRX configuration information of multiple UE-As.

At operation 2, the UE-B determines a resource set setA according to the adjusted resource selection window and/or the DRX configuration information of the multiple UE-As.

At operation 3, the UE-B performs resource exclusion based on the resource set setA to obtain a resource set setB.

This operation is the same as the operation 3 of the embodiment shown in FIG. 6, and reference can be made to the above embodiment for details.

At operation 4, the UE-B selects one or more resources from the resource set setB.

At operation 5, the UE-B selects a destination address for the transmission.

The selection strategy of the destination address for this operation is the same as that of the operation 402 of the embodiment shown in FIG. 10, and reference can be made to the above embodiment for details.

At operation 6, an MAC PDU is assembled and sent to the destination address.

The DRX configuration information of the multiple target UEs are considered in the above embodiments, and the DRX configuration information of the multiple target UEs are considered before the first operation (i.e., the resource exclusion) of the resource selection. Firstly, the position of the resource selection window is adjusted according to the DRX configuration information of the multiple target UEs, and then one or more resources are selected according to the DRX configuration information of the multiple target UEs from the available resource set of the adjusted resource selection window, so as to perform the sidelink data transmission, thereby improving the reliability of the sidelink transmission.

In an optional embodiment of the present disclosure, the one or more resources for the sidelink transmission are selected according to the DRX configuration information of the multiple second devices from an available resource set obtained by the resource exclusion.

Figure 13:
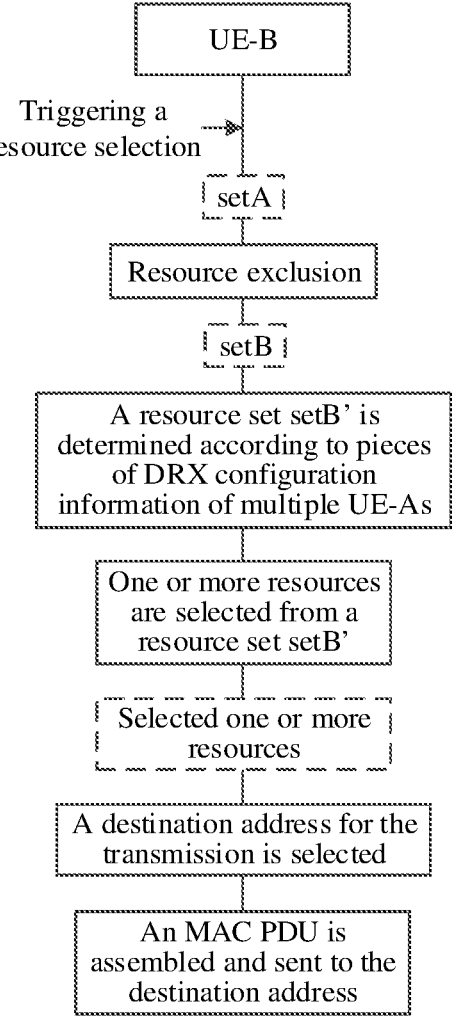
FIG. 13 is a tenth flowchart of a resource selection method according to an embodiment of the present disclosure.

FIG. 13 is a tenth flowchart of a resource selection method according to an embodiment of the present disclosure. As shown in FIG. 13, the method includes the following operations.

At operation 1, a UE-B performs resource exclusion based on a resource set setA to obtain a resource set setB.

This operation is the same as the operation 3 of the embodiment shown in FIG. 6, and reference can be made to the above embodiment for details.

At operation 2, the UE-B determines a resource set setB' according to DRX configuration information of multiple UE-As.

At operation 3, the UE-B selects one or more resources from the resource set setB'.

At operation 4, the UE-B selects a destination address for the transmission.

The selection strategy of the destination address for this operation is the same as that of the operation 402 of the embodiment shown in FIG. 10, and reference can be made to the above embodiment for details.

At operation 5, an MAC PDU is assembled and sent to the destination address.

The DRX configuration information of the multiple target UEs are considered in the above embodiments, and the DRX configuration information of the multiple target UEs are considered after the first operation (i.e., the resource exclusion) of resource selection. The one or more resources are selected according to the DRX configuration information of the multiple target UEs from the available resource set obtained by the resource exclusion, thereby improving the reliability of the sidelink transmission.

In an optional embodiment of the present disclosure, an available resource set is selected from available resources obtained by a resource selection; and the one or more resources for the sidelink transmission are selected according to the DRX configuration information of the multiple second devices from the available resource set.

Exemplarily, FIG. 14 is an eleventh flowchart of a resource selection method according to an embodiment of the present disclosure. As shown in FIG. 14, the method includes the following operations.

At operation 1, a UE-B performs resource exclusion based on a resource set setA to obtain a resource set setB.

This operation is the same as the operation 3 of the embodiment shown in FIG. 6, and reference can be made to the above embodiment for details.

At operation 2, the UE-B selects an available resource set from the resource set setB.

The available resource set includes one or more resources.

At operation 3, the UE-B checks resources in the selected available resource set according to DRX configuration information of multiple UE-As, so as to obtain one or more resources obtained by the resource check.

The one or more resources obtained by the resource check are one or more resources matching with the DRX configurations of the multiple UE-As. That is, the one or more resources obtained by the resource check may be one or more resources determined based on an intersection of the DRX configurations of the multiple of UE-As, one or more resources determined based on an union of the DRX configurations of the multiple of UE-As, or one or more resources determined based on other comprehensive considerations.

At operation 4, the UE-B selects a destination address for the transmission.

The selection strategy of the destination address for this operation is the same as that of the operation 402 of the embodiment shown in FIG. 10, and reference can be made to the above embodiment for details.

At operation 5, an MAC PDU is assembled and sent to the destination address.

The DRX configuration information of the multiple target UEs are considered in the embodiments. The DRX configuration information of the multiple target UEs are considered after the second operation (i.e., resource reservation) of resource selection, and one or more resources matching with the DRX configurations of multiple target UEs are selected to perform the sidelink data transmission, thereby improving the reliability of the sidelink transmission.

Based on the above several embodiments, a detailed implementation of selecting one or more resources for the sidelink transmission according to the DRX configuration information of the multiple second devices is summarized as follows.

In some embodiments, a common DRX active time shared by the multiple second devices is determined according to the DRX configuration information of the multiple second devices, and the one or more resources for the sidelink transmission are selected according to the common DRX active time shared by the multiple second devices. That is, the one or more resources for the sidelink transmission may be selected according to the intersection of DRX active times of the multiple second devices.

In some embodiments, a DRX active time of at least one of the multiple second devices is determined according to the DRX configuration information of the multiple second devices, and the one or more resources for the sidelink transmission are selected according to a DRX active time of at least one of the multiple second devices. That is, the one or more resources for the sidelink transmission may be selected according to the DRX active time of one of the multiple second devices, or the one or more resources for the sidelink transmission may be selected according to a union of DRX active times of at least two of the multiple second devices.

The resource selection methods provided by the above embodiments solve the problem of how to select resources by comprehensively considering the DRX configuration and by comprehensively considering the DRX configuration information of the multiple UEs at the receiving end when the UE at the sending end selects resources in a case where the SL DRX mechanism is introduced. Specifically, the resources may selected by considering the DRX configuration information of the multiple UEs at the receiving end before the first operation (i.e., the resource exclusion) of the resource selection, after the first operation of resource selection, or after the second operation (i.e., resource reservation) of resource selection, which can ensure that the UEs at the receiving end are in the DRX active time when the sidelink data is transmitted, thereby improving the reliability of the data transmission in the sidelink communication.

It should be noted that the technical solutions of the above embodiments can applicable in unicast, multicast or broadcast scenarios in the NR-V2X communication.

The resource selection method provided by the embodiments of the present disclosure has been described in detail above, and a resource selection device provided by the embodiments of the present disclosure would be described below.

FIG. 15 is a structural diagram of a resource selection device according to an embodiment of the present disclosure. As shown in FIG. 15, the resource selection device 500 in the embodiment includes a processing module 501 and a sending module 502.

The processing module 501 is configured to selects, according to DRX configuration information of one or more second devices, one or more resources for sidelink transmission.

In an optional embodiment of the present disclosure, the processing module 501 is specifically configured to:

select a third device from multiple second devices; and
  select, according to DRX configuration information of the third device, the one or more resources for the sidelink transmission.

In an optional embodiment of the present disclosure, the third device satisfies at least one of following conditions.

The third device is a device triggering a resource selection from the multiple second devices.

The third device is a device having at least one of an MAC CE or a logical channel with a highest priority from the multiple second devices.

In an optional embodiment of the present disclosure, the processing module 501 is specifically configured to:

select, according to the DRX configuration information of the third device, the one or more resources for the sidelink transmission from an available resource set of a resource selection window.

In an optional embodiment of the present disclosure, the processing module 501 is specifically configured to:

adjust a position of a resource selection window according to the DRX configuration information of the third device; and
  select, from an available resource set of the adjusted resource selection window, the one or more resources for the sidelink transmission.

In an optional embodiment of the present disclosure, the processing module 501 is specifically configured to:

select, according to the DRX configuration information of the third device, the one or more resources for the sidelink transmission from an available resource set obtained by resource exclusion.

In an optional embodiment of the present disclosure, the processing module 501 is specifically configured to:

select, from available resources obtained by resource selection, an available resource set; and
  select, according to the DRX configuration information of the third device, the one or more resources for the sidelink transmission from the available resource set.

In an optional embodiment of the present disclosure, the resource selection device 500 further includes the sending module 502.

The sending module 502 is configured to send sidelink data to the third device on the one or more resources for the sidelink transmission.

In an optional embodiment of the present disclosure, the processing module 501 is specifically configured to:

select, according to the DRX configuration information of multiple second devices, the one or more resources for the sidelink transmission.

In an optional embodiment of the present disclosure, the processing module 501 is specifically configured to:

select, according to the DRX configuration information of the multiple second devices, the one or more resources for the sidelink transmission from an available resource set of a resource selection window.

In an optional embodiment of the present disclosure, the processing module 501 is specifically configured to:

adjust, according to the DRX configuration information of the multiple second devices, a position of the resource selection window; and
  select, from an available resource set of the adjusted resource selection window, the one or more resources for the sidelink transmission.

In an optional embodiment of the present disclosure, the processing module 501 is specifically configured to:

select, according to the DRX configuration information of the multiple second devices, the one or more resources for the sidelink transmission from an available resource set obtained by resource exclusion.

In an optional embodiment of the present disclosure, the processing module 501 is specifically configured to:

select, from available resources obtained by resource selection, an available resource set; and

select, according to the DRX configuration information of the multiple second devices, the one or more resources for the sidelink transmission from the available resource set.

In an optional embodiment of the present disclosure, the processing module 501 is specifically configured to:

select, according to a common DRX active time shared by the multiple second devices, the one or more resources for the sidelink transmission. The common DRX active time shared by the multiple second devices is determined according to the DRX configuration information of the multiple second devices.

In an optional embodiment of the present disclosure, the processing module 501 is specifically configured to:

select, according to a DRX active time of at least one of the multiple second devices, the one or more resources for the sidelink transmission. The DRX active time of the at least one of the multiple second device is determined according to the DRX configuration information of the multiple second devices.

In an optional embodiment of the present disclosure, the processing module 501 is further configured to select a fourth device from the multiple second devices.

The sending module 502 is configured to send sidelink data to the fourth device on the one or more resources for the sidelink transmission.

In an optional embodiment of the present disclosure, the fourth device satisfies at least one of following conditions.

The fourth device is a device having at least one of an MAC CE or a logical channel with a highest priority from the multiple second devices.

The fourth device is a device in a DRX activation state on the one or more resources for the sidelink transmission from the multiple second devices.

The resource selection device provided by the embodiments of the present disclosure is configured to perform the technical solution performed by the first device in any of the aforementioned method embodiments and has a similar implementation principle and technical effect, which would not be repeated herein.

It should be noted that the partitioning of the modules of the resource selection device is merely a logical functional partitioning, which may, in practice, be fully or partially integrated into a physical entity or may be physically separate. And these modules can all be implemented in the form of software invoked by processing elements, or implemented in the form of hardware. It is also possible that some modules are implemented in the form of software invoked by the processing elements and some modules are implemented in the form of hardware. For example, the processing module may be a processing element arranged separately, or may be integrated in a chip in the device. Optionally, the processing module may be stored in the memory of the device in the form of program codes, and invoked by a processing element of the device to perform the functions of the processing module. The implementation of other modules is similar. In addition, all or part of these modules can be integrated or implemented independently. The processing element described herein may be an integrated circuit with signal processing capability. In implementation, the operations or modules of the method may be implemented by integrated logic circuits of hardware in the processor element or by instructions in the form of software.

For example, the above modules may be one or more integrated circuits configured to implement the above methods, such as, one or more Application Specific Integrated Circuits (ASICs), or one or more Digital Signal Processor (DSP), or one or more Field Programmable Gate Arrays (FPGAs), etc. For another example, when one of the above modules is implemented in the form of a processing element scheduling the program codes, the processing element may be a general purpose processor, such as a Central Processing Unit (CPU) and other processors that can invoke the program codes. For another example, these modules can be integrated and implemented in the form of a system-on-a-chip (SOC).

The above-described embodiments may be fully or partially implemented in the form of software, hardware, firmware or any combination thereof. When implemented in the form of software, they may be fully or partially implemented in the form of a computer program product. The computer program product includes one or more computer instructions. When computer program instructions are loaded and executed on a computer, the flow or functions according to the embodiments of the present disclosure is fully or partially generated. The computer may be a general purpose computer, a dedicated computer, a computer network, or other programmable device. The computer instructions may be stored in a computer-readable storage medium or transmitted from one computer-readable storage medium to another. For example, the computer instructions may be transmitted from one Web site, computer, server, or data center to another Web site, computer, server, or data center in a wired manner (e.g., coaxial cable, optical fiber, digital subscriber line (DSL)) or wireless manner (e.g., infrared, wireless, microwave, etc.). The computer-readable storage medium may be any available medium that a computer may access or a data storage device such as a server, a data center, or the like that contains one or more integrations of available medium. The available medium may be a magnetic medium (e.g., floppy disk, hard disk, magnetic tape), an optical medium (e.g., digital videodisc (DVD)), or a semiconductor medium (e.g., Solid State Disk (SSD)), etc.

Figure 16:
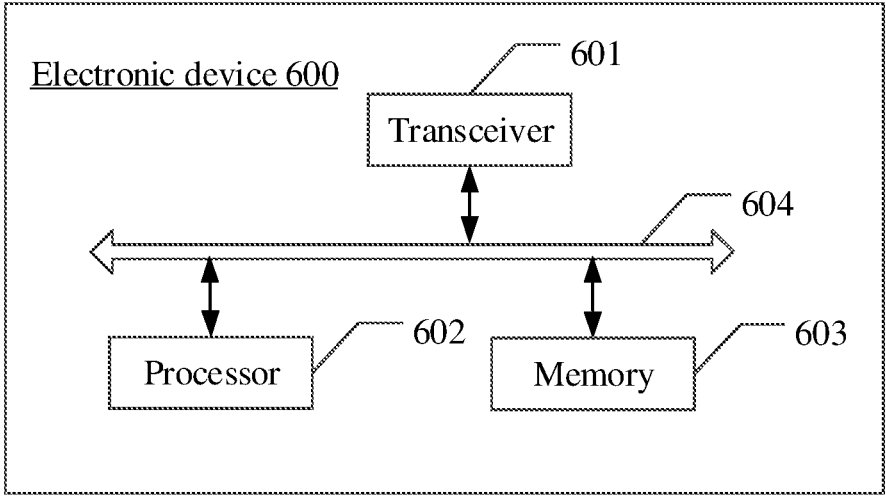
FIG. 16 is a diagram of a hardware structure of an electronic device according to an embodiment of the present disclosure.

FIG. 16 is a diagram of a hardware structure of an electronic device according to an embodiment of the present disclosure. As shown in FIG. 16, the electronic device 600 includes:

a transceiver 601, a processor 602 and a memory 603.

The memory 603 s configured to store computer-executable instructions.

The processor 602 is configured to execute the computer-executable instructions stored in the memory 603, so as to enable the processor to perform the technical solution performed by the first device in any of the aforementioned method embodiments.

Optionally, the memory 603 may be either separate from or integrated with the processor 602. When the memory 603 is a device separated from the processor 602, the electronic device 600 may further include a bus 604 configured to connect the memory 603 and the processor 602.

Optionally, the processor 602 may be a chip.

The present disclosure also provides a computer-readable storage medium having stored thereon a computer program that, when executed by a computer, implements technical solution performed by the first device in any of the above method embodiments.

The embodiments of the disclosure also provide a program, when the program is executed by a processor, implements the technical solution performed by the first device in the above-mentioned method embodiments.

The embodiments of the disclosure also provide a computer program product including program instructions for implementing the technical solution performed by the first device in the above-mentioned method embodiments.

The embodiments of the disclosure also provide a chip including a processing module and a communication interface, where the processing module is configured to implement the technical solution performed by the first device in the method embodiments.

Furthermore, the chip further includes a memory module (e.g., a memory) configured to store instructions. The processing module is configured to execute the instructions stored in the memory module, and the execution of the instructions stored in the memory module enables the processing module to perform the technical solution performed by the first device.

In the present disclosure, the term "at least two" means two or multiple, and "multiple" means two or more. The term "and/or" is intended to describe an association relationship between associated objects and may represent that three kinds of relationships may exist. For example, A and/or B may represent three conditions: i.e., independent existence of A, existence of both A and B, and independent existence of B. Both A and B may be singular or plural. The character "/" in the disclosure generally indicates that the associated objects before and after this character is in an "or" relationship. In a formula, the character "/" indicates that the related objects are in a "division" relationship. The term "at least one of the following" or similar expression is any combination of these items, including any combination of multiple single items or plural items. For example, at least one of a, b, or c may represent a, b, c, a-b, a-c, b-c, or a-b-c, where a, b, c may be single or multiple.

It should be understood that the various numerical numbers in the embodiments of the present disclosure are only for the convenience of description and are not intended to limit the scope of the embodiments of the present disclosure.

It should be understood that in the embodiments of the present disclosure, the size of the sequence numbers of the above implementation processes does not imply an implementation order, and the implementation order of various processes should be determined by the functions and inherent logics of the processes. The sequence numbers of the above implementation processes should not constitute any limitation of the implementation processes of the embodiments of the present disclosure.

The invention claimed is:

1. A resource selection method, performed by a first device, the method comprising:
   selecting, according to Discontinuous Reception (DRX) configuration information of one or more second devices, one or more resources for sidelink transmission,
   wherein the one or more second devices comprise a plurality of second devices, and
   selecting, according to the DRX configuration information of one or more second devices, the one or more resources for the sidelink transmission comprises:
   selecting, according to the DRX configuration information of the plurality of second devices, the one or more resources for the sidelink transmission,
   wherein the method further comprises:
   selecting a fourth device from the plurality of second devices; and
   sending sidelink data to the fourth device on the one or more resources for the sidelink transmission,
   wherein the fourth device satisfies the following conditions:
   the fourth device being a device having at least one of a Medium Access Control Control Element (MAC CE)

or a logical channel with a highest priority from the plurality of second devices; or
   the fourth device being the device having at least one of the MAC CE or the logical channel with the highest priority from the plurality of second devices, and the fourth device being a device in a DRX activation state on the one or more resources for the sidelink transmission from the plurality of second devices.

2. The method of claim 1,
   wherein selecting, according to the DRX configuration information of the one or more second devices, the one or more resources for the sidelink transmission comprises:
   selecting a third device from the plurality of second devices; and
   selecting, according to DRX configuration information of the third device, the one or more resources for the sidelink transmission.

3. The method of claim 2, wherein selecting, according to the DRX configuration information of the third device, the one or more resources for the sidelink transmission comprises:
   selecting, according to the DRX configuration information of the third device, the one or more resources for the sidelink transmission from an available resource set of a resource selection window.

4. The method of claim 2, wherein selecting, according to the DRX configuration information of the third device, the one or more resources for the sidelink transmission comprises:
   selecting, according to the DRX configuration information of the third device, the one or more resources for the sidelink transmission from an available resource set obtained by resource exclusion.

5. The method of claim 1, wherein selecting, according to the DRX configuration information of the plurality of second devices, the one or more resources for the sidelink transmission comprises:
   selecting, according to the DRX configuration information of the plurality of second devices, the one or more resources for the sidelink transmission from an available resource set of a resource selection window.

6. The method of claim 1, wherein selecting, according to the DRX configuration information of the plurality of second devices, the one or more resources for the sidelink transmission comprises:
   selecting, according to the DRX configuration information of the plurality of second devices, the one or more resources for the sidelink transmission from an available resource set obtained by resource exclusion.

7. The method of claim 1, wherein selecting, according to the DRX configuration information of the plurality of second devices, the one or more resources for the sidelink transmission comprises:
   selecting, according to a common DRX active time shared by the plurality of second devices, the one or more resources for the sidelink transmission, wherein the common DRX active time shared by the plurality of second devices is determined according to the DRX configuration information of the plurality of second devices.

8. The method of claim 1, wherein selecting, according to the DRX configuration information of the plurality of second devices, the one or more resources for the sidelink transmission comprises:
   selecting, according to a DRX active time of at least one of the plurality of second devices, the one or more resources for the sidelink transmission, wherein the DRX active time of the at least one of the plurality of second device is determined according to the DRX configuration information of the plurality of second devices.

9. An electronic device, comprising:

a processor and a memory, wherein the memory is configured to store computer-executable instructions; and the processor is configured to execute the computer-executable instructions stored in the memory to:

select, according to Discontinuous Reception (DRX) configuration information of one or more second devices, one or more resources for sidelink transmission, wherein the one or more second devices comprise a plurality of second devices, and wherein the processor is further configured to:

select, according to the DRX configuration information of the plurality of second devices, the one or more resources for the sidelink transmission, select a fourth device from the plurality of second devices; and send sidelink data to the fourth device on the one or more resources for the sidelink transmission, wherein the fourth device satisfies the following conditions:

the fourth device being a device having at least one of a Medium Access Control Control Element (MAC CE) or a logical channel with a highest priority from the plurality of second devices; or the fourth device being the device having at least one of the MAC CE or the logical channel with the highest priority from the plurality of second devices, and the fourth device being a device in a DRX activation state on the one or more resources for the sidelink transmission from the plurality of second devices.

10. The electronic device of claim 9, wherein the processor is further configured to:

select a third device from the plurality of second devices; and select, according to DRX configuration information of the third device, the one or more resources for the sidelink transmission.

11. The electronic device of claim 10, wherein the processor is further configured to:

select, according to the DRX configuration information of the third device, the one or more resources for the sidelink transmission from an available resource set of a resource selection window.

12. The electronic device of claim 10, wherein the processor is further configured to:

select, according to the DRX configuration information of the third device, the one or more resources for the sidelink transmission from an available resource set obtained by resource exclusion.

13. The electronic device of claim 9, wherein the processor is further configured to:

select, according to the DRX configuration information of the plurality of second devices, the one or more resources for the sidelink transmission from an available resource set of a resource selection window.

14. The electronic device of claim 9, wherein the processor is further configured to:

select, according to the DRX configuration information of the plurality of second devices, the one or more resources for the sidelink transmission from an available resource set obtained by resource exclusion.

15. The electronic device of claim 9, wherein the processor is further configured to select, according to a common DRX active time shared by the plurality of second devices, the one or more resources for the sidelink transmission, wherein the common DRX active time shared by the plurality of second devices is determined according to the DRX configuration information of the plurality of second devices.

16. The electronic device of claim 9, wherein the processor is further configured to:

select, according to a DRX active time of at least one of the plurality of second devices, the one or more resources for the sidelink transmission, wherein the DRX active time of the at least one of the plurality of second device is determined according to the DRX configuration information of the plurality of second devices.

* * * * *